(12) United States Patent
Bremicker

(10) Patent No.: US 6,507,980 B2
(45) Date of Patent: Jan. 21, 2003

(54) HOLDER

(75) Inventor: Michael Bremicker, Rehe (DE)

(73) Assignee: ABUS August Bremicker Sohne KG (DE)

( * ) Notice: Subject to any disclaimer, the term of this patent is extended or adjusted under 35 U.S.C. 154(b) by 0 days.

(21) Appl. No.: 09/934,150

(22) Filed: Aug. 21, 2001

(65) Prior Publication Data

US 2002/0026694 A1 Mar. 7, 2002

(30) Foreign Application Priority Data

Aug. 21, 2000 (DE) ......................................... 100 40 806

(51) Int. Cl.[7] ................................................. F16L 33/14
(52) U.S. Cl. .................. 24/269; 248/229.17; 248/230.8
(58) Field of Search ............................... 24/269, 274 R, 24/270, 271, 19; 248/689, 74.3, 74.4, 218.4, 229.17, 230.8, 231.21, 231.51, 231.81, 499, 310, 316.1, 309.1; 362/459, 473, 474, 475

(56) References Cited

U.S. PATENT DOCUMENTS

| | | | | |
|---|---|---|---|---|
| 2,480,775 A | * | 8/1949 | McElroy | ....................... 24/269 |
| 2,604,098 A | * | 7/1952 | Kranc | ....................... 24/269 X |
| 3,533,588 A | * | 10/1970 | Cregier | ....................... 24/269 X |
| 3,988,007 A | * | 10/1976 | Freiburger, Jr. | ............. 24/68 R |
| 4,768,741 A | * | 9/1988 | Logsdon | .............. 248/230.8 X |
| 5,436,810 A | * | 7/1995 | Sutherland et al. | ........... 362/72 |
| 6,322,279 B1 | * | 11/2001 | Yamamoto et al. | ........... 403/97 |

* cited by examiner

*Primary Examiner*—Robert J. Sandy
(74) *Attorney, Agent, or Firm*—Gifford, Krass, Groh, Sprinkle, Anderson & Citkowski, P.C.

(57) ABSTRACT

A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving means which has elevations and recesses formed in a complementary manner.

33 Claims, 7 Drawing Sheets

HOLDER

Figure 1:
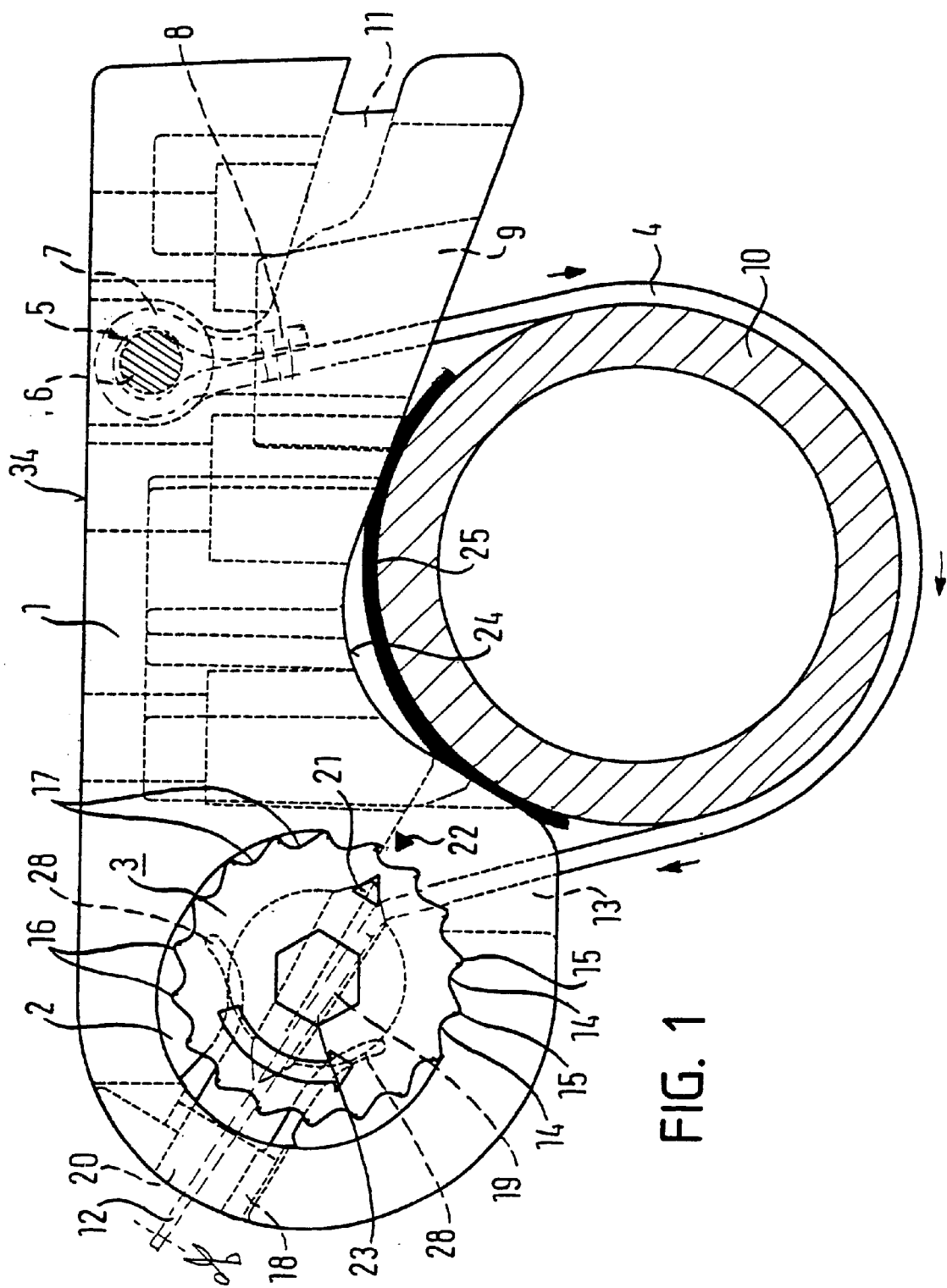

The invention relates to a holder for the fastening of functional elements to bar-shaped elements.

Such holders are used, for example in the bicycle area, to attach lock holders, lighting means, water bottles and the like to a bar-shaped frame element of a bicycle.

It is the underlying object of the invention to provide a holder of the kind initially mentioned which can be used for bar-shaped elements with different cross-sectional shapes and cross-sectional sizes, with in particular a simple, stable and permanent fastening of the holder to the bar-shaped element being ensured with a simultaneously low-cost manufacturing possibility of the holder.

The object is satisfied in accordance with the invention by the features of claim 1 and in particular by a strap element being provided whose one end is fixed to a fastening point in a housing and by furthermore a rotational element being provided which is pivotally mounted in a receiving mount formed in the housing and which has a passage slot for the other end of the strap element, with the rotational element having at least one substantially cylindrical section whose jacket surface, which is provided with elevations and recesses, extends parallel to the axis of rotation of the rotational element and can be brought into engagement with a section of the receiving mount which has complementarily formed elevations and recesses.

In accordance with the invention, therefore, the free or other end of the strap element is laid around the bar-shaped element and subsequently inserted into the passage slot of the rotational element, with the strap element moving so far through the passage slot until it has contacted the bar-shaped element as properly as possible, whereupon the rotational element is turned, for example by means of a suitable tool, such that the strap element is wound onto the rotational element. During this winding up procedure, the elevations and recesses of the rotational element-engage into the corresponding elevations and recesses of the receiving mount and in this manner prevent the rotational element from turning backwards. The rotational element is now turned so far until the strap element is tensioned tightly around the bar-shaped element and the holder is thus fastened in a stable manner to the bar-shaped element. The friction between the strap element and the rotational element or the friction retainment of the strap element is hereby ensured by this not moving relative to the rotational element. Finally, the unused region of the strap element, which protrudes out of the holder, can be cut off.

It is achieved by the use of the strap element in accordance with the invention that the holder can be fastened to bar-shaped elements of any cross-section and any size since the flexible and thus freely formable strap element adapts to any cross-sections due to the applied tensile stress and since any cross-section sizes of bar-shaped elements can be used thanks to a sufficient length of the strap element.

It is preferred if the housing has a strap element insertion opening which extends in the direction of the rotational element starting from the bar-shaped element around which the strap element is to be wrapped. The strap element is inserted through this strap element insertion opening into the passage slot of the rotational element during the installation of the holder.

The elevations and recesses of the receiving mount for the rotational element can be arranged in the region of the receiving mount provided for the rotational element which faces the strap element insertion opening. It is sufficient here if these elevations and recesses are provided only in this region of the receiving mount since the tensile stress of the strap element acting on the rotational element has the effect that the rotational element is pulled into the region of these elevations and recesses so that an unintentional turning back of the rotational element during or after the installation can be precluded.

The elevations of the rotational element can be formed free of undercutting, in particular rounded at their radially outer ends. It is made possible in this manner that the rotational element can also be directly turned back again by the application of an appropriate rotatory force, for example by means of a tool, in order to thus dismantle the holder from the bar-shaped element.

It is, however, also alternatively possible to directly fit the elevations of the rotational element with undercuts in order thus to achieve the effect that the holder is directly destroyed in applications where a release of the holder should not be possible when an attempt is made to forcibly turn back the rotational element.

The housing preferably has at least one strap element exit opening extending, starting from the fastening point, in the direction of the bar-shaped element to be wrapped around by the strap element. The strap element fastened at the fastening point exits the housing through this strap element exit opening and contacts the bar-shaped element, whereupon it can be moved through the said strap element insertion opening in the direction of the passage slot of the rotational element.

It is preferred if two or more strap element exit openings are provided which are each matched to different cross-sectional sizes of the bar-shaped elements. This is explained in the following with reference to the figures.

The rotational element can preferably be axially inserted into the receiving mount formed in the housing and can preferably be axially fixed there. This allows a simple ex works assembly of the holder of the invention.

It is of advantage if the rotational element is formed as a toothed dumbbell which has a region of smaller diameter which is arranged between two regions of larger diameter, with the two regions of larger diameter each having elevations and recesses at their jacket surfaces and the region of smaller diameter being provided with the passage slot. In this case, the strap element can be wound up on the region of smaller diameter while the regions of larger diameter prevent the toothed dumbbell from rolling back unintentionally by means of the elevations and recesses.

To allow a winding up of the strap element onto the region of smaller diameter, the width of the region of smaller diameter is preferably dimensioned slightly larger than the width of the strap element.

An axial fixation device can preferably be inserted into the housing which engages into the intermediate space formed between the two regions of larger diameter of the dumbbell and adjacent to the region of smaller diameter. Since this engagement therefore takes place in that region in which the strap element is wound up, it must be ensured that the axial fixation device does not hinder a winding up of the strap element. This is achieved either by the axial fixation device only engaging into such a region in which the strap element does not need any room or by the axial fixation device being formed resiliently so that it is pressed radially outwardly with respect to the rotational element by the wound up strap element.

The axial fixation device can preferably be inserted into the housing from the side remote from the strap element insertion opening with respect to the rotational element or the toothed dumbbell. For this purpose, a corresponding opening, which is opposite the strap element insertion opening, must be formed in the housing.

It is particularly advantageous if the axial fixation device comprises at least one resilient element which pre-loads the toothed dumbbell in the direction of the strap element insertion opening. The elevations and recesses of the toothed dumbbell come into engagement with the elevations and recesses of the receiving mount in this manner such that an unintentional rotation of the toothed dumbbell is prevented.

The axial fixation device preferably has a passage region for the strap element. The section of the strap element needed with an installed holder can project out of the housing through this passage region and optionally be cut off.

The axial fixation device can advantageously be latched in the housing, which in turn facilitates the ex works assembly of the holder.

It is of advantage if the rotational element has a tool engagement element, in particular a hexagonal recess for an Allen wrench, at an end face, preferably at both end faces. In this case, the holder of the invention can be fixed to the bar-shaped element by a user with a normal, commercial tool, which is in particular of advantage in the use of the holder of the invention in the bicycle area.

A closure element, which covers the end face of the rotational element and the receiving mount in a visually appealing manner with an installed holder, can be inserted into the tool engaging element and/or into the intermediate space between the rotational element and the receiving element formed as an elongate aperture. When the closure element is inserted into the intermediate space between the rotational element and the receiving mount formed as an elongate aperture, the closure element can additionally press the rotational element in the direction of the elevations and recesses so that an improved engagement is achieved between the rotational element and the receiving mount.

Starting from a larger cross-section, as the depth increases, the passage slot of the rotational element can narrow to a smaller cross-section. This funnel-like formation of the passage slot facilitates the insertion of the strap element, on the one hand, and it increases the friction between the strap element and the rotational element in the region of the smaller cross-section, on the other hand, so that relative movements between the strap element and the rotational element are prevented to an even higher degree.

The rotational element can be provided with a marking at an end face, preferably at both end faces, which is arranged at the periphery of the rotational element with respect to that side at which the passage slot opens with a larger cross-section. This marking can then be aligned by the user of the holder of the invention by a rotation of the rotational element such that said marking points in a certain direction, in particular to a marking provided at the housing, with it being ensured in this position of the rotational element that the strap element insertion opening is aligned with the passage slot of the rotational element so that a problem-free insertion of the strap element becomes possible.

The free cross-section of the receiving mount provided for the rotational element is preferably somewhat larger than the outer periphery of the regions of larger diameter of the toothed dumbbell so that a problem-free insertion of the dumbbell into the receiving mount is made possible.

The receiving mount for the rotational element provided in the housing is advantageously formed as an elongate aperture. It is achieved in this way that the rotational element can be displaced perpendicular to its axis of rotation in the receiving mount so that it becomes possible to bring the elevations and recesses of the rotational element into or out of engagement with the elevations and recesses of the receiving mount as required in the installation or dismantling of the holder of the invention. In the installation of the holder of the invention, the rotational element in the elongate aperture is compulsorily drawn in the direction of the strap element insertion opening by the winding up of the strap element such that the elevations and recesses of the rotational element come into engagement with the elevations and recesses of the receiving mount. Alternatively, however, it is also possible to form the receiving mount provided in the housing as an opening with a circular cross-section. In this case, for example, one, preferably two, pivotally mounted, pre-loaded toothed shoes can then project into the opening, with the teeth of the toothed shoes being formed in a complementary manner to the elevations and recesses of the rotational element. The relative movement between the elevations and recesses of the rotational element and the teeth of the toothed shoes forming a component of the receiving mount is in this case therefore not achieved by the elongate aperture, but by the pivoting capability of the toothed shoes.

When the rotational element is formed as a toothed dumbbell, it is preferred if the two toothed shoes are provided in the two regions of larger diameter of the toothed dumbbell, since—as already mentioned—the elevations and recesses, which should come into engagement with the toothed shoes—are also present in these two regions. One peripheral elevation and recess each can furthermore be provided in the toothed dumbbell and regions formed in a complementary manner in the receiving mount so that an axial fixing of the toothed dumbbell in the receiving mount is achieved by an alternate engagement of these regions.

To allow a direct dismantling of the holder of the invention, the toothed shoes can be formed movably away from the rotational element via the application of a force to an engagement surface. The teeth are brought out of engagement with the elevations and recesses of the toothed dumbbell by such a movement such that the toothed dumbbell can be turned back in a direction in which the strap element is wound off the toothed dumbbell and the holder is thus released from the bar-shaped element.

A connection surface for a functional element, in particular a lock holder, a lighting body or a water bottle, is preferably provided at the holder of the invention. Alternatively, however, it is also possible to form such a functional element in one piece with the holder of the invention.

The housing of the holder of the invention preferably has a recess for the reception of a region of the bar-shaped element, with this recess being advantageously formed such that the bar-shaped element connects the recess over the full area or at least at two line regions in order thus to provide the largest possible force transmission surface between the bar-shaped element and the holder.

The strap element is preferably made from a largely fatigue-free material which is only slightly stretchable; the use of polypropylene or polyester is particularly useful here.

The rotational element can be made, for example, from pressure die cast zinc.

The use of glass fiber reinforced, break resistant plastic is of use as the housing material.

The strap element can be designed, for example, as a fabric or textile strap or as a metal strap. Alternatively, it is also possible to design the strap element as a rubberized strap or as a rubber strap.

Further preferred embodiments of the invention are described in the dependent claims.

Figure 2:
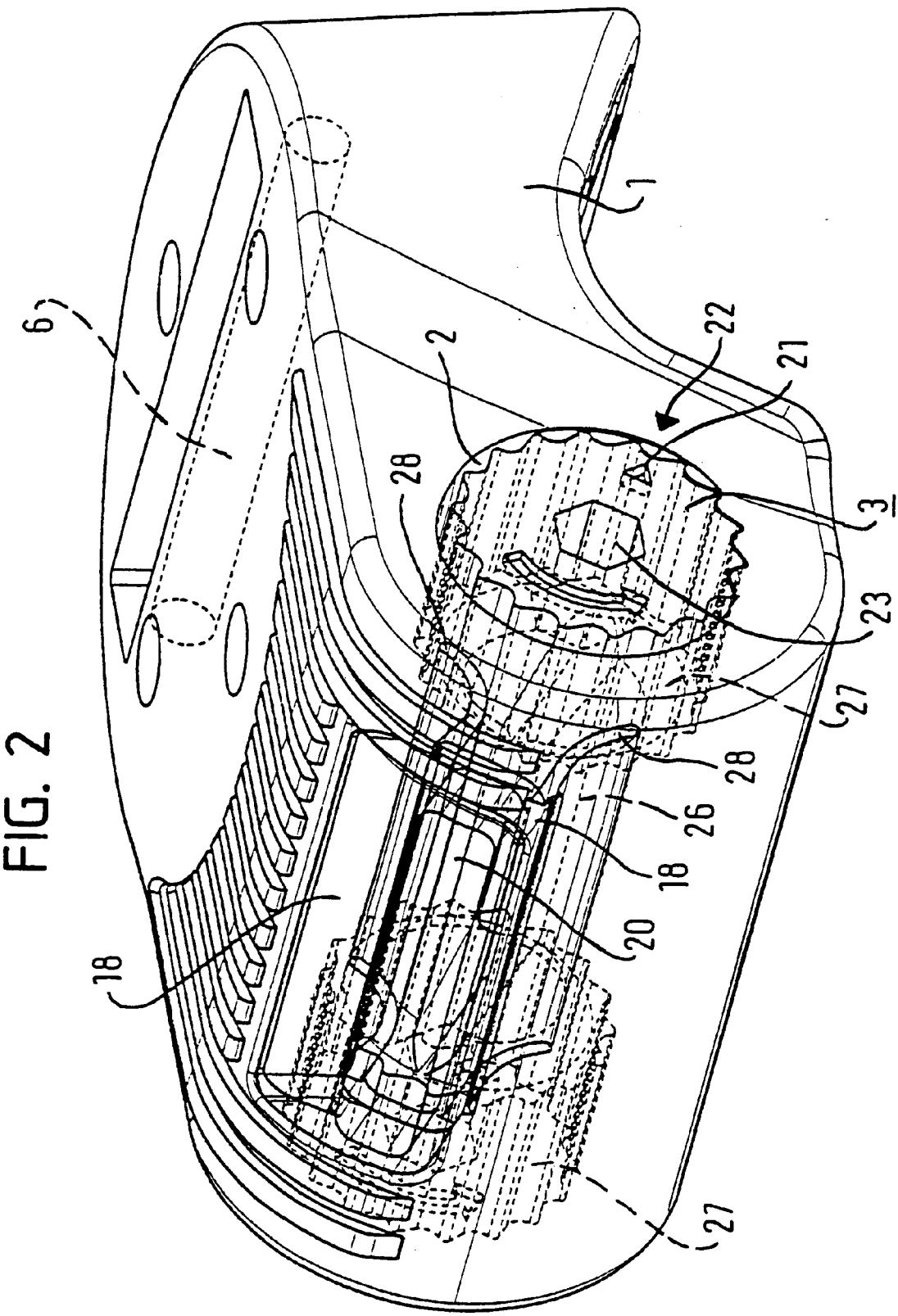
Figure 3:
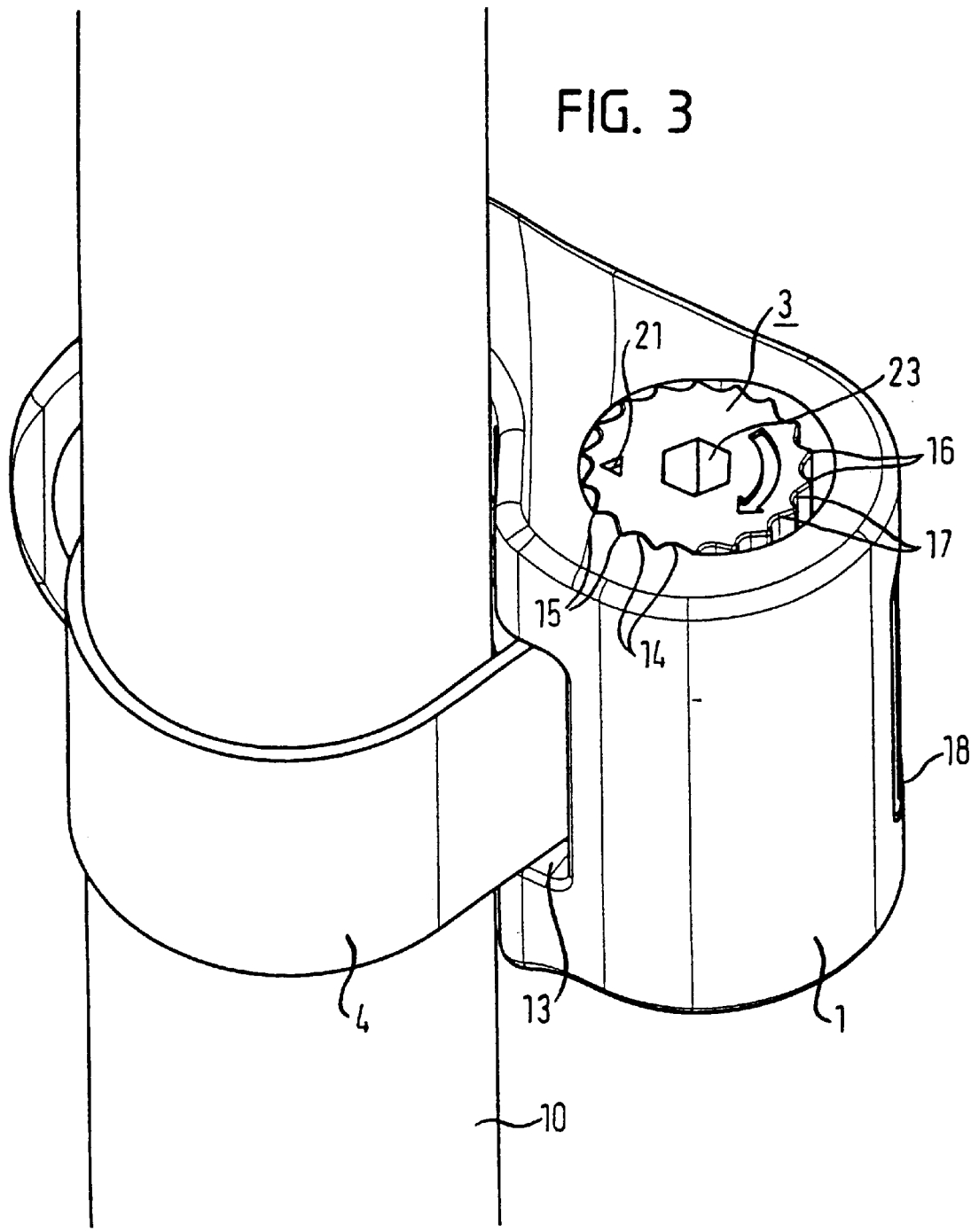
Figure 4:
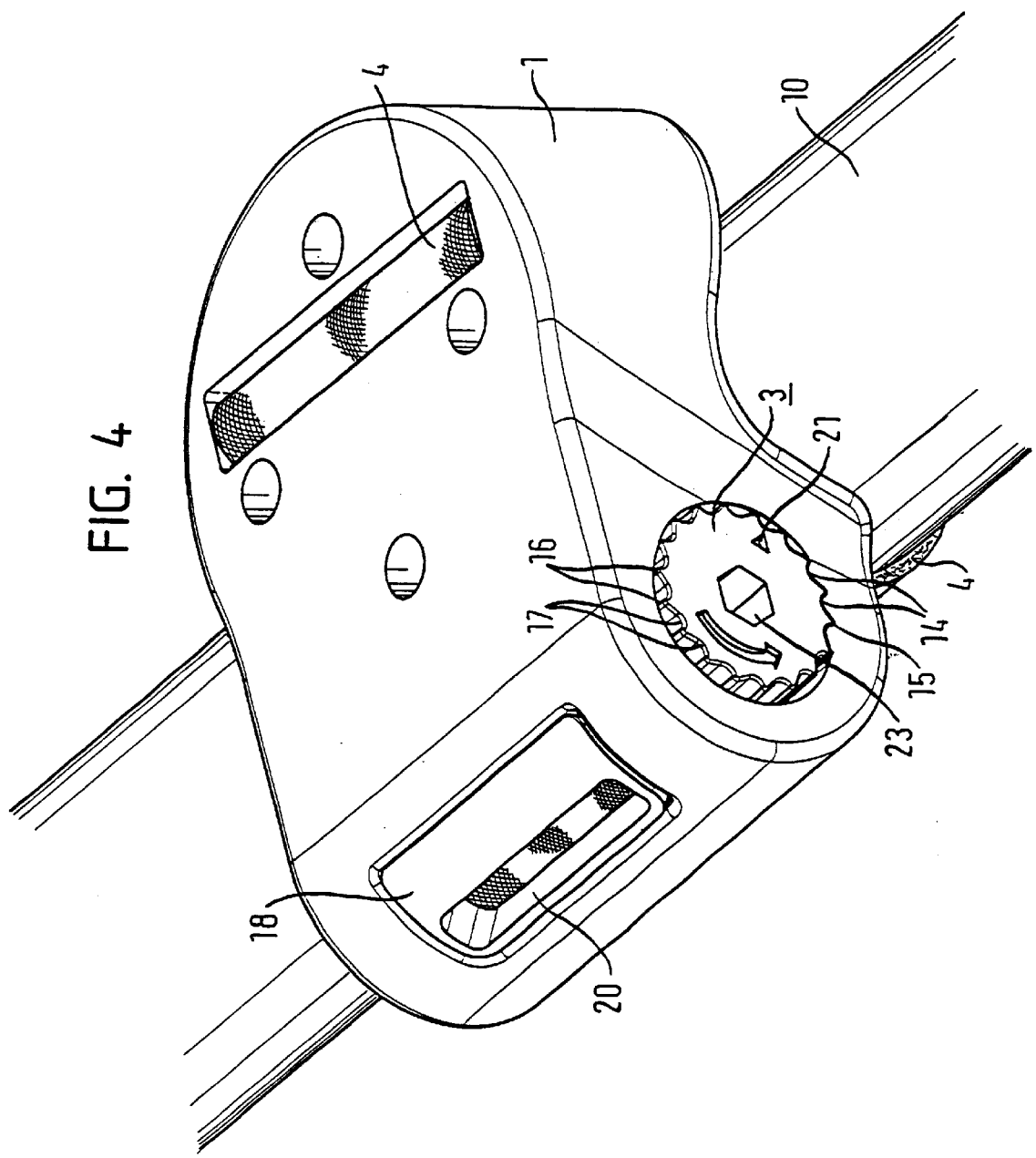
Figure 5:
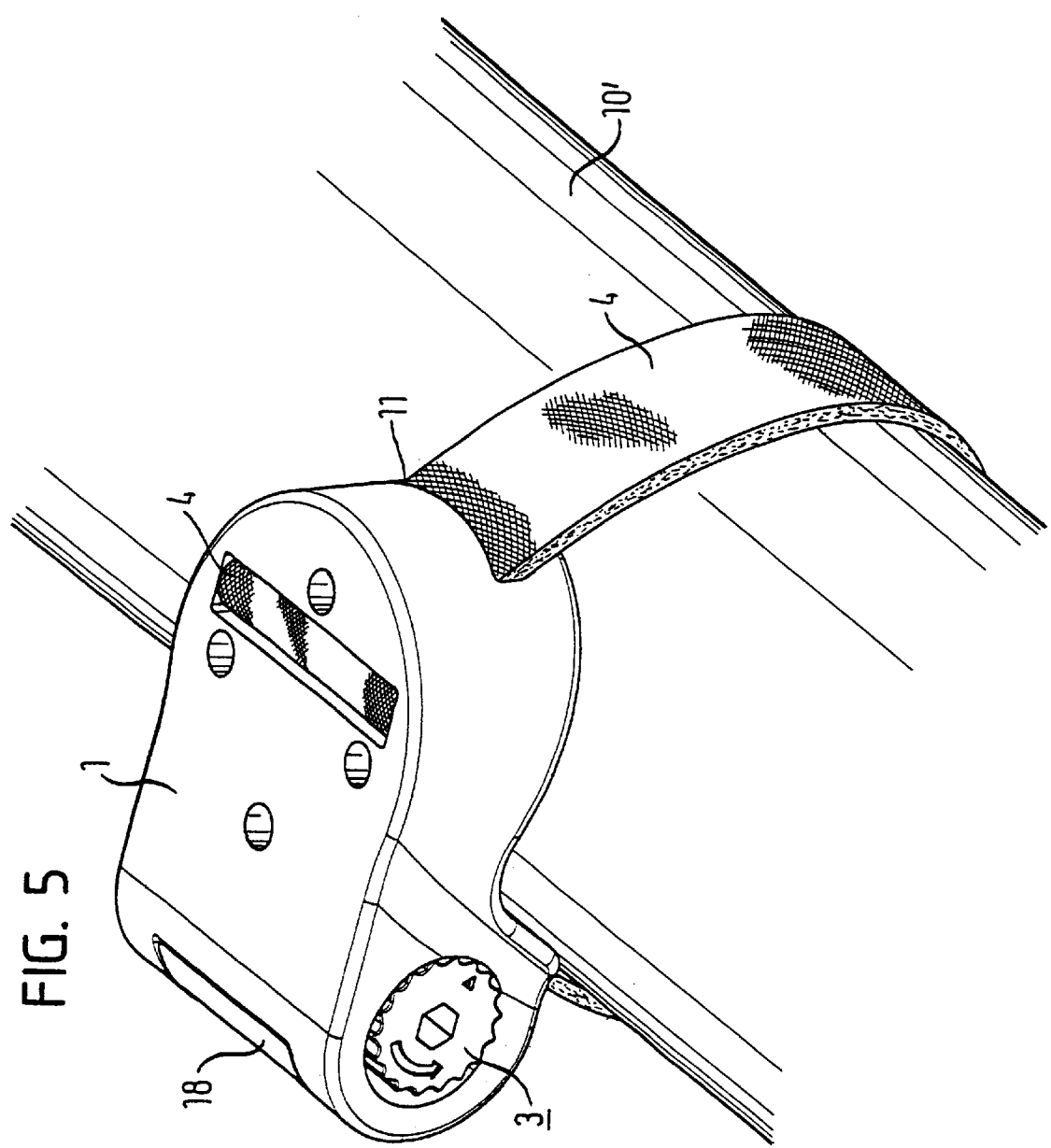
Figure 6:
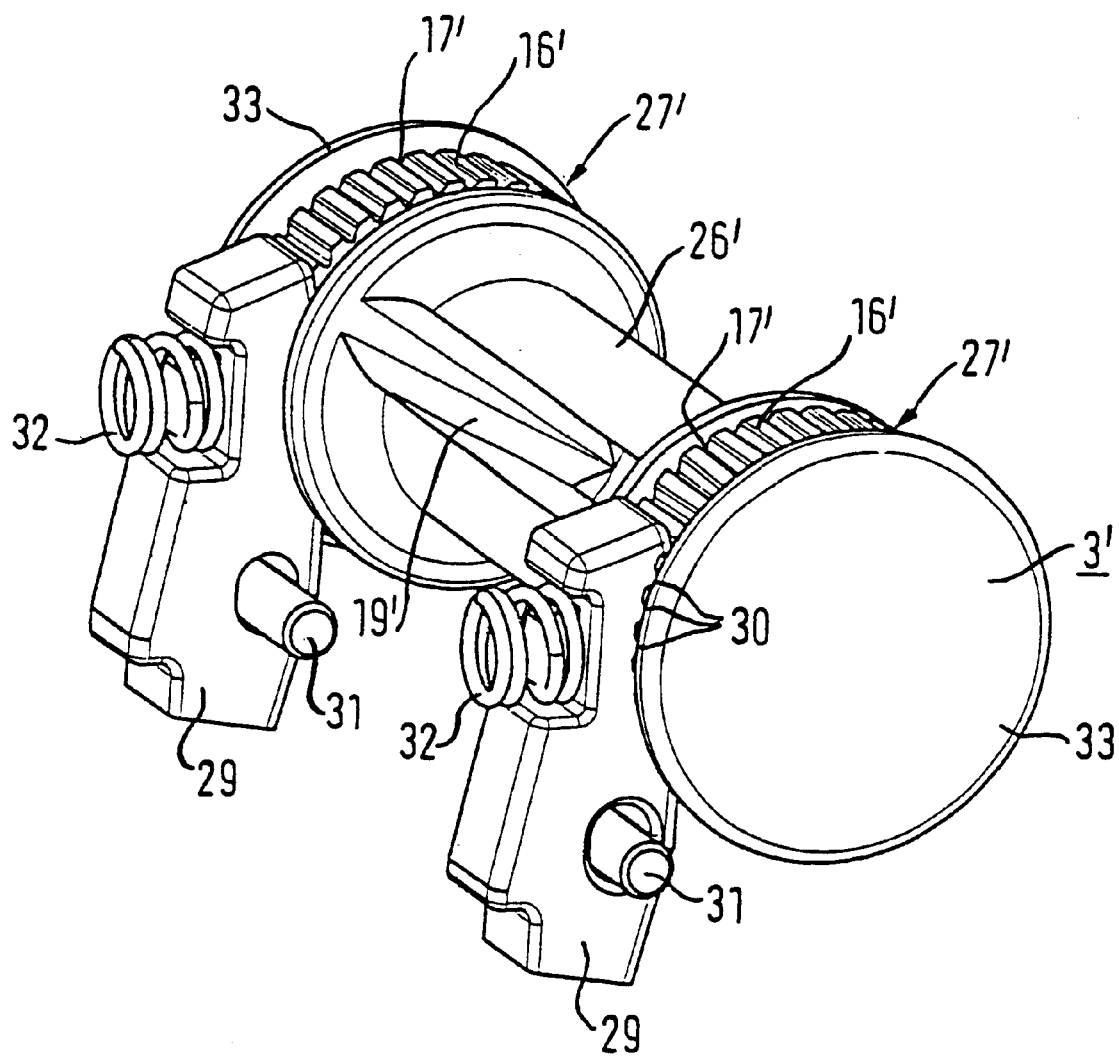
Figure 7:
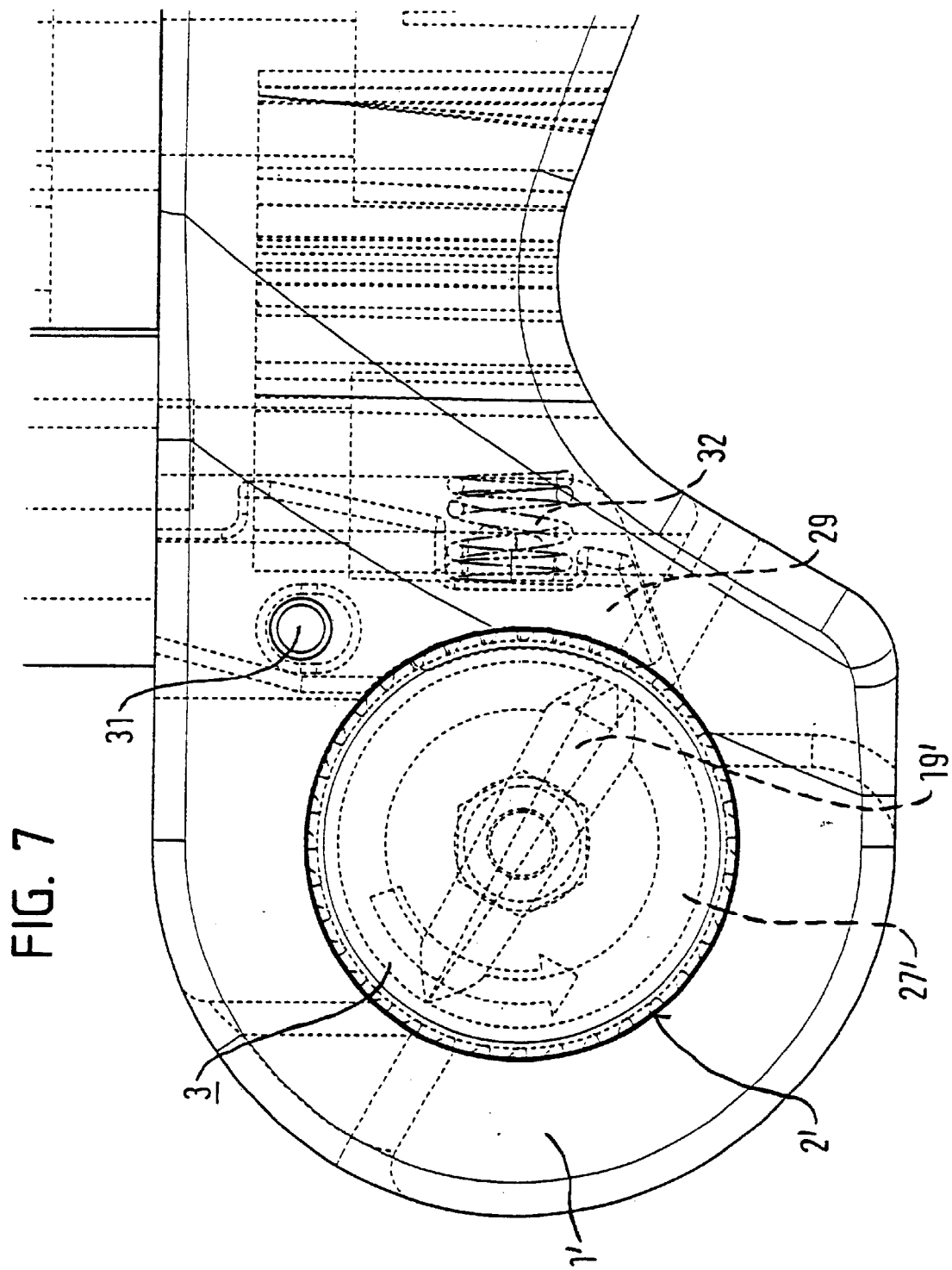

The invention is explained in the following by way of examples with reference to the drawings; in which are shown:

FIG. 1 a side view of a holder of the invention fastened to a bar-shaped element in accordance with a first embodiment variant, including a strap element;

FIG. 2 a perspective view of a holder of FIG. 1 without a strap element;

FIG. 3 a perspective view of a holder of FIG. 1 with a strap element;

FIG. 4 a further perspective view of a holder of the invention of FIG. 3;

FIG. 5 a perspective view of a holder of the invention of FIGS. 1 to 4, which is fastened to a bar-shaped element of enlarged diameter;

FIG. 6 a perspective view of a toothed dumbbell of the invention having two toothed shoes; and FIG. 7 a side view of a region of a holder of the invention in accordance with a second embodiment variant having a toothed dumbbell and toothed shoes in accordance with FIG. 6.

The holder of the invention in accordance with FIG. 1 consists substantially of a housing 1, in which a rotational element 3 formed as a toothed dumbbell is arranged in a receiving mount 2 provided for this purpose, and of a strap element 4 which is fixedly connected to the housing 1 at a fastening point 5.

The fastening point 5 is substantially formed by a hardened or unhardened steel pin 6 which is fixedly connected to the housing 1 or inserted into the housing and around which an end of the strap element 4 is wrapped in a manner such that the strap element 4 forms a loop 7 in the region of the steel pin 6, with the free end 8 of the strap element 4 being sewn to a region of the strap element 4 spaced from this free end 8 for this purpose.

The strap element 4 fixed to the steel pin 6 in the said manner in the region of the fastening point 5 in the housing 1 exits the housing 1 from a first strap element exit opening 9. The strap element exit opening 9 is dimensioned here such that the strap element can exit the housing 1 at different angles in order thus to take into account different cross-sections of bar-shaped elements 10 to which the holder of the invention is to be fastened.

Still a further strap element exit opening 11 is provided in the housing 1 and extends away from the fastening point 5 at a different angle region to the strap element exit opening 9. This further strap element exit opening 11 is then used for the exit of the strap element 4 instead of the strap element exit opening 9 when the holder of the invention in accordance with FIG. 1 is to be fixed to a bar-shaped element with a much larger diameter (see FIG. 5).

Starting from the strap element exit opening 9, the strap element 4 is laid around the bar-shaped element 10, which is of hollow cylindrical shape in the illustrated example, and its free end 12 remote from the fastening point 5 is subsequently inserted into a strap element insert opening 13 formed in the housing 1. Like the strap element exit openings 9, 11, the strap element insertion element 13 is formed such that the strap element 4 can enter the housing 1 at different angles in order thus to in turn take in to account different cross-section sizes of bar-shaped elements 10.

The strap element insertion opening 13 extends from the outside of the housing 1 in the direction of the toothed dumbbell 3 up into the receiving mount 2 such that the strap element 4 can be pushed through the strap element insertion opening 13 into the region of the receiving mount 2.

The receiving mount 2 is designed in the illustrated embodiment as an elongate aperture which is provided with elevations 14 and recesses 15 in that region which faces the strap element insertion opening 13.

The toothed dumbbell 3 has elevations 16 and recesses 17 along its outer periphery which are formed in a complementary manner to the elevations 14 and recesses 15 of the elongate aperture 2 such that the toothed dumbbell 3 can be fixed in a rotatory manner in the elongate aperture 2 by the mutually engaging elevations 14, 16 and recesses 15, 17. If, however, the toothed dumbbell 3 in the elongate aperture 2 is moved away from the strap element insertion opening 13, the elevations 14, 16 and recesses 15, 17 come out of engagement such that a rotation of the toothed dumbbell 3 in the elongate aperture 2 becomes possible.

All elevations 14 and recesses 15 are formed free of undercutting and rounded so that—when appropriately high forces are applied—a rotation of the toothed dumbbell 3 in the elongate aperture 2 against the drawn arrow direction is generally also possible free of damage for the dismantling of the holder when the elevations 14, 16 and recesses 15, 17 are in engagement with one another.

An axial fixation device 18 can be inserted into the housing 1 at the side remote from the strap element insertion opening 13 with respect to the toothed dumbbell 3. This axial fixation device is described in more detail below with reference to FIG. 2.

The toothed dumbbell 3 has a passage slot 19 (FIG. 1) through which the free end 12 of the strap element 4 can be threaded after it has passed through the strap element insertion opening 13. The free end 12 of the strap element 4 exits the housing 1 via a passage region 20 provided in the axial fixation device 18.

Starting from a larger cross-section, the passage slot 19 of the toothed dumbbell 3 narrows to a smaller cross-section as the depth increases. To facilitate a threading of the free end 12 of the strap element 4 into the passage slot 19, the toothed dumbbell 3 is provided with a marking 21 at the end face which is arranged on the periphery of the toothed dumbbell 3 with respect to that side at which the passage slot 19 with a larger cross-section opens. To simplify the correct rotatory alignment of the toothed dumbbell 3, a further marking 22 is provided at the housing 1 with which the marking 21 of the toothed dumbbell 3 is to be aligned.

The toothed dumbbell 3 is provided at the end face with a hexagonal recess 23 into which an Allen wrench can be inserted in order to directly set the toothed dumbbell 3 into rotation.

The housing 1 has a recess 24 between the fastening part 5 and the elongate aperture 2 which is provided for the reception of a region of the bar-shaped element 10. An optional flexible inlay 25, made in particular of rubber, is arranged between the bar-shaped element 10 and the recess 24, increases the friction between the bar-shaped element 10 and the housing 1 and moreover produces a force which prevents an unintentional release of the holder of the invention from the bar-shaped element 10. When the strap element 4 is designed as a rubberized strap or as a rubber strap, the flexible inlay 25 can be omitted.

A connection surface 34 for any kind of functional element, in particular for lock holders, lighting means or water bottles, is provided at the end of the housing 1 remote from the recess 24.

It can be seen from the perspective illustration of FIG. 2 that the toothed dumbbell 3 has a region of smaller diameter 26 which is arranged between two regions of larger diameter 27. The two regions of larger diameter 27 are each provided at their jacket surfaces with the elevations 16 and recesses 17, while no such elevations or recesses are present in the region of smaller diameter 26. However, the passage slot 19 for the strap element 4 is present in the region of smaller diameter 26. Since the width of the region of smaller diameter 26 is dimensioned somewhat larger than the width of the strap element 4, it is possible to wind the strap element 4 onto the region of smaller diameter 26 so that the wound up strap element 4 is ultimately located between the two regions of larger diameter 27.

The elongate aperture 2 is dimensioned such that its cross-section is greater than the cross-section of the regions of larger diameter 27 of the toothed dumbbell 3 such that the toothed dumbbell 3 can be inserted into the elongate aperture axially from the outside. To fix the position of the toothed dumbbell 3 axially in the elongate aperture 2, the axial fixation device 18 already mentioned in connection with FIG. 1 is provided which can be inserted into the housing 1 from the outside. This axial fixation device 18 engages into the region which is formed between the two regions of greater diameter 27 of the toothed dumbbell 3 and which is adjacent to the region of smaller diameter 26 of the toothed dumbbell 3, with the axial fixation device 18 having two resilient elements 28 which effect the said engagement and are arranged such that no axial movement of the toothed dumbbell 3 is possible in the elongate aperture 2.

Since the elements 28 are formed in a resilient manner, it is ensured that they are not in the way of the strap element 4 to be wound up and that the wound up strap element 4 can press the resilient elements 28 radially outwardly with respect to the toothed dumbbell 3. The resilient elements 28 moreover press the toothed dumbbell 3 in the direction of the elevations 14 and recesses 15 of the receiving mount 2 before or during the installation of the holder so that no unintentional rotation of the toothed dumbbell 3 takes place.

In the installation of a holder of the invention in accordance with FIGS. 1 and 2, the strap element is laid around the bar-shaped element 10 in the described manner and threaded through the strap element insertion opening 13, the passage slot 19 and the passage region 20 until the strap element 4 contacts the bar-shaped element 10 as properly as possible. The toothed dumbbell is subsequently turned in the direction of the arrow by means of an Allen wrench inserted into the hexagonal recess 23, whereby a stressing of the strap element 4 and a compression of the optional flexible inlay 25 is effected, with the friction between the strap element 4 and the passage slot 19, in particular the region of reduced cross-section of the passage slot 19, preventing the strap element 4 from again moving out of the passage slot 19. If this friction is not sufficient therefor, the dumbbell 3 is turned so far (at least 180°) until strap element 4 comes to rest on strap element 4 in the region of smaller diameter 26 of the toothed dumbbell 3 so that a retainment by friction takes place which then prevents an unwanted exiting of the strap element 4 from the passage slot 19. It is thus possible to fix the holder of the invention very fixedly and permanently to the bar-shaped element 10 by means of the Allen wrench.

The region of the strap element 4 which is not needed can be cut off in the region of the scissor symbol shown in FIG. 1 after the fastening has taken place.

FIGS. 3 and 4 each show a perspective view from different angles of view, with here the holder of the invention fixed to the bar-shaped element 10 being shown in accordance with FIGS. 1 and 2. The reference symbols used in FIGS. 3 and 4 correspond to those of FIGS. 1 and 2.

FIG. 5 shows a holder of the invention in accordance with FIGS. 1 to 4, with this holder in accordance with FIG. 5 now being fixed to a bar-shaped element 10' with a very enlarged diameter. To make this possible, the strap element 4 in accordance with FIG. 5 does not exit the strap element exit opening 9 as in FIGS. 3 and 4, but the strap element exit opening 11 of the housing 1 (see FIG. 1).

FIG. 6 shows a perspective illustration of an alternatively formed toothed dumbbell 3'. In agreement with the toothed dumbbell 3 of FIGS. 1 to 5, the toothed dumbbell 3' also has a region of smaller diameter 26' which is arranged between two regions of larger diameter 27', with the two regions of larger diameter 27' each having elevations 16' and recesses 17' at their jacket surfaces. The region of smaller diameter 26' in turn has a passage slot 19' which, starting from a larger cross-section, narrows to a smaller cross-section as the depth increases.

The elevations 16' and the recesses 17' of the two regions of larger diameter 27 are each in engagement with a toothed shoe 29 which respectively has teeth 30 which are formed in complementary manner to the elevations 16' and recesses 17' of the regions of larger diameter 27' of the toothed dumbbell 3'.

Both toothed shoes 29 are pivotally mounted over one pin 31 each and are pre-loaded by one compression spring 32 each such that they are pressed in the direction of the toothed dumbbell 3' such that the teeth 30 of the toothed shoes 29 come into engagement with the elevations 16' and the recesses 17'.

FIG. 7 shows the way in which the toothed shoes 29 are fixed via pins 31 in the housing 1' of the holder of the invention. The toothed shoes 29 are pressed into the region of the receiving mount 2', in which the toothed dumbbell 3' is received, by the pivotal journaling of the toothed shoes 29 and the exposure to the force of the compression springs 32. To allow an engagement of the teeth 30 of the toothed shoes 29 into the recesses 17' of the toothed dumbbell 3', the receiving mount 2' is open in the direction of the toothed shoe 29, that is the housing 1 has an opening in the appropriate region.

In contrast to the embodiment of FIGS. 1 to 5, the receiving mount 2' can be formed in a circular manner when the toothed shoes 29 are provided.

The toothed dumbbell 3' can preferably be provided at its two end faces with one closure cap 33 each, of which at least one can be removed, with the diameter of the closure caps 33 being dimensioned larger than the diameter of the receiving mount 2'. In this manner, the closure caps 33 can completely cover the receiving mount 2', which results in an appealing appearance of the holder of the invention.

The fastening of a hose to a pipe or of a pipe body to another pipe body is also understood as the fastening of a functional element (hose, pipe body) to a bar-shaped element (pipe, pipe body) within the meaning of the invention. The fastening of a functional element to a bar-shaped element by the functional element being clamped between the strap element and the bar-shaped element is also covered by the invention.

Reference Symbol List

1,1' housing
2,2' receiving mount/elongate aperture
3,3' rotational element/toothed dumbbell
4 strap element
5 fastening point
6 steel pin
7 loop
8 free end of the strap element
9 strap element exit opening
10,10' bar-shaped element 11 strap element exit opening
12 free end
13 strap element insertion opening
14 elevations
15 recesses
16,16' elevations
17,17' recesses
18 axial fixation device
19,19' passage slot
20 passage region
21 marking
22 marking
23 hexagonal recess
24 recess
25 flexible inlay
26,26' region of smaller diameter
27,27' region of larger diameter
28 resilient elements
29 toothed shoes
30 teeth
31 pin
32 compression spring
33 closure caps
34 connection surface

What is claimed is:

1. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein the rotational element is formed as a toothed dumbbell which has a region of smaller diameter which is arranged between two regions of larger diameter, with the two regions of larger diameter each having elevations and recesses at their jacket surfaces and with the region of smaller diameter being provided with the passage slot.

2. A holder in accordance with claim 1, characterized in that the housing has a strap element insertion opening which extends in the direction of the rotational element starting from the bar-shaped element around which the strap element is to be wrapped.

3. A holder in accordance with claim 1, characterized in that the elevations and recesses are arranged in the region of the receiving mount provided for the rotational element adjacent a strap element insertion opening.

4. A holder in accordance with claim 1, characterized in that the elevations of the rotational element are formed free of undercutting, in particular rounded at their radially outer ends.

5. A holder in accordance with claim 1, characterized in that the housing has at least one strap element exit opening extending, starting from the fastening point, in the direction of the bar-shaped element around which the strap element is to be wrapped.

6. A holder in accordance with claim 1, characterized in that the rotational element can be inserted axially into the receiving mount formed in the housing and can in particular be axially fixed there.

7. A holder in accordance with claim 1, characterized in that the strap element is designed as a fabric, textile, rubber or metal strap or as a rubbberized strap.

8. A holder in accordance with claim 1, characterized in that the width of the region of smaller diameter is slightly larger than the width of the strap element.

9. A holder in accordance with claim 1, characterized in that an axial fixation device can be inserted into the housing and engages into the intermediate space formed between the two regions of larger diameter of the toothed dumbbell and adjacent to the region of smaller diameter.

10. A holder in accordance with claim 9, characterized in that the axial fixation device can be inserted into the housing from the side remote from the strap element insertion opening with respect to the toothed dumbbell.

11. A holder in accordance with claim 9, characterized in that the axial fixation device comprises at least one resilient element which pre-loads the toothed dumbbell in the direction of the strap element insertion opening.

12. A holder in accordance with claim 9, characterized in that the axial fixation device has a passage region for the strap element.

13. A holder in accordance with claim 9, characterized in that the axial fixation device can be latched in the housing.

14. A holder in accordance with claim 1, characterized in that the rotational element has a tool engagement element, in particular a hexagonal recess for an Allen wrench, at an end face.

15. A holder in accordance with claim 1, characterized in that, starting from a larger cross-section, the passage slot narrows to a smaller cross-section as a depth of said passage slot increases.

16. A holder in accordance with claim 15, characterized in that the rotational element is provided with a marking at an end face which is arranged at the periphery of the rotational element with respect to that side at which the passage slot opens with a larger cross-section.

17. A holder in accordance with claim 1, characterized in that a free cross-section of the receiving mount provided for the rotational element is larger than the outer periphery of the regions of larger diameter of a toothed dumbbell.

18. A holder in accordance with claim 1, characterized in that the receiving mount for the rotational element provided in the housing is formed as an elongate aperture.

19. A holder in accordance with claim 1, characterized in that the receiving mount for the rotational element provided in the housing is formed as an opening with a circular cross-section.

20. A holder in accordance with claim 19, characterized in that at least one pivotally mounted toothed shoes, which are pre-loaded, project into the opening and their teeth are formed in a complementary manner to the elevations and recesses of the rotational element.

21. A holder in accordance with claim 20, characterized in that the two toothed shoes are provided in the two regions of larger diameter of a toothed dumbbell.

22. A holder in accordance with claim 20, characterized in that the toothed shoes can be moved away from the rotational element via the application of a force onto an engagement surface.

23. A holder in accordance with claim 1, characterized in that a connection surface for a functional element is provided.

24. A holder in accordance with claim 1, characterized in that the housing is made of a glass fiber reinforced, high strength plastic.

25. A holder in accordance with claim 1, characterized in that the housing has a recess for the reception of a region of the bar-shaped element.

26. A holder in accordance with claim 1, characterized in that the strap element is made of a largely fatigue-free, only slightly stretchable material, in particular of polypropylene or polyester.

27. A holder in accordance with claim 1, characterized in that the rotational element is made of a pressure die cast zinc.

28. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein the housing is made of a glass fiber reinforced, high strength plastic.

29. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein the rotational element is made of a pressure die cast zinc.

30. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein the elevations of the rotational element are formed free of undercutting, in particular rounded at their radially outer ends.

31. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein the rotational element has a tool engagement element, in particular a hexagonal recess for an Allen wrench, at an end face.

32. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein starting from a larger cross-section, the passage slot narrows to a smaller cross-section as a depth of the passage slot increases.

33. A holder for the fastening of functional elements to bar-shaped elements having a strap element, whose one end is fixed to a fastening point in a housing, and having a rotational element which is pivotally mounted in a receiving mount formed in the housing and has a passage slot for the other end of the strap element, with the rotational element having at least one substantially cylindrical section, whose jacket surface provided with elevations and recesses extends parallel to the axis of rotation of the rotational element and can be brought into engagement with a section of the receiving mount which has elevations and recesses formed in a complementary manner wherein the strap element is made of a largely fatigue-free, only slightly stretchable material, in particular of polypropylene or polyester.

* * * * *